United States Patent [19]

Drutchas, deceased

[11] Patent Number: 4,790,522
[45] Date of Patent: Dec. 13, 1988

[54] ELECTROVISCOUS FLUID CONTROL DEVICE

[75] Inventor: Gilbert H. Drutchas, deceased, late of Birmingham, Mich., by Elaine M. Drutchas, legal representative

[73] Assignee: TRW Inc., Lyndhurst, Ohio

[21] Appl. No.: 160,486

[22] Filed: Feb. 25, 1988

[51] Int. Cl.$^4$ ............................................. F16F 13/00
[52] U.S. Cl. ................................... 267/225; 188/267; 188/299; 280/707
[58] Field of Search ................................ 188/267, 299; 267/64.15, 64.25, 35, 140.1, 225; 280/707

[56] References Cited

U.S. PATENT DOCUMENTS

| | | |
|---|---|---|
| 3,059,915 | 10/1962 | Kemelhor . |
| 3,174,587 | 3/1965 | Walton .................................. 188/267 |
| 4,342,334 | 8/1982 | Stangroom . |
| 4,720,087 | 1/1988 | Duclos et al. ..................... 267/140.1 |

FOREIGN PATENT DOCUMENTS

| | | | |
|---|---|---|---|
| 0221034 | 12/1983 | Japan .................................. 188/267 |
| 0006446 | 1/1984 | Japan .................................. 188/267 |
| 0968534 | 11/1982 | U.S.S.R. ............................ 188/267 |
| 1060831 | 12/1983 | U.S.S.R. ............................ 188/267 |
| 2111171 | 6/1983 | United Kingdom . |

Primary Examiner—Duane A. Reger
Attorney, Agent, or Firm—Tarolli, Sundheim & Covell

[57] ABSTRACT

An apparatus for connection between relatively movable parts. The apparatus includes a variable volume chamber having a first portion for connection with one of the parts and a second portion for connection with another of the parts. The chamber has fluid therein for resisting movement of the parts relative to each other. A valve controls the fluid flow from the chamber to a location at which the fluid does not resist relative movement of the parts. The valve includes a valve member movable from a first position to provide fluid communication between the chamber and the location. An electroviscous fluid control device resists movement of the valve member form the first position.

30 Claims, 9 Drawing Sheets

ELECTROVISCOUS FLUID CONTROL DEVICE

BACKGROUND OF THE INVENTION

1. Field of the Invention

The present invention relates to fluid shock absorbers, fluid springs, and the like. Particularly, the present invention relates to an electroviscous fluid control device for controlling the flow of fluid in shock absorbers and fluid springs for use in a vehicle suspension system.

2. Description of the Prior Art

Shock absorbers using electroviscous fluid are known. For example, British Patent Application No. 2,111,171 discloses such a shock absorber. The shock absorber includes a cylinder and a piston. The piston is located in the cylinder and divides the cylinder into two chamber portions. Electroviscous fluid fills both of the chamber portions. A passage permits flow of the electroviscous fluid between the chamber portions during relative movement of the piston and cylinder. The viscosity of the electroviscous fluid in the passage is varied by varying the magnitude of an electrical field applied to the electroviscous fluid in the passage. As the viscosity of the electroviscous fluid in the passage increases, the flow through the passage decreases, thereby increasing the damping rate of the shock absorber.

U.S. Pat. No. 3,059,915 discloses a fluid damping device which also uses an electroviscous fluid. The viscosity of the electroviscous fluid varies as a function of the magnitude of a magnetic field applied thereto. Flow of the electroviscous fluid through a passage is controlled by applying the magnetic field to the fluid in the passage. The amount of flow of the fluid through the passage controls the damping rate of the device.

These known devices have the disadvantage that the damping (working) fluid is the electroviscous fluid. Electroviscous fluids are relatively expensive. Since a relatively large volume of the fluid is used in each device, the total overall cost of the device is relatively high.

SUMMARY OF THE INVENTION

The present invention provides an advantage over the known devices in that the damping (working) fluid is not electroviscous fluid. Instead, a relatively small amount of electroviscous fluid is used to control movement of a control valve. The control valve controls flow of the working fluid which effects the damping action. A device embodying the present invention is particularly suitable for use in an automotive vehicle suspension system.

A device embodying the present invention is connectable to relatively movable vehicle parts. The device includes means defining a variable volume fluid chamber. The chamber has hydraulic fluid therein for resisting relative movement of the parts. A valve controls fluid flow from the chamber to a location at which the fluid does not resist relative movement of the parts. The valve includes a valve member movable from a first position to provide fluid communication between the chamber and the location. An electroviscous fluid resists movement of the valve member from the first position.

A shock absorber for use in a vehicle suspension system and made according to one embodiment of the present invention includes a cylinder defining a fluid chamber. A piston is located in the fluid chamber and divides the chamber into first and second chamber portions. The piston is connectable with one vehicle part and the cylinder is connectable with another vehicle part. The piston and cylinder are relatively movable in compression and expansion strokes during relative movement of the vehicle parts. Fluid flows between the first and second chamber portions to damp the relative movement of the vehicle parts. A valve controls flow of the fluid between the first and second chamber portions. The valve includes a valve member movable from a closed position to an open position to allow fluid to flow between the first and second chamber portions. An electroviscous fluid resists movement of the valve to the open position. The valve moves to an open position due to fluid pressure in one of the chamber portions acting on the valve and overcoming the resistance of the electroviscous fluid.

Another embodiment of the present invention includes a spring for biasing relatively movable vehicle parts to an initial position. The spring is compressible and extendible during relative movement of the parts. A fluid resists compression of the spring. The fluid is located in a variable volume chamber A valve controls the flow of fluid from the variable volume chamber and thus controls the resistance of the spring to compression. The valve includes a valve member movable from a first position to allow fluid flow from the chamber. An electroviscous fluid controls movement of the valve member from the first position.

The valve member has a portion for restricting the flow of working fluid. The electroviscous fluid preferably is an electrorheological fluid communicated from a compliance chamber through a passage to a chamber adjacent the valve member and acts on the valve member at a location opposite the portion of the valve member which restricts fluid flow.

The viscosity of the electrorheological fluid varies as a function of the magnitude of an electrical field applied thereto. The electrical field is applied to a portion of the electrorheological fluid disposed in the passage. Increasing the magnitude of the electrical field applied to the electrorheological fluid in the passage increases the viscosity of that portion of the electrorheological fluid and restricts the flow of electrorheological fluid through the passage. This restricts flow of the electrorheological fluid from the chamber adjacent to the valve member and, thus, resists movement of the valve member.

A controller controls the magnitude of the electrical field applied to the electrorheological fluid. The controller responds to one or more signals from a sensor or sensors indicative of a vehicle condition or conditions. The sensor or sensors may sense the distance between the parts being damped, the speed of the vehicle, braking, the condition of the road (such as being rough or smooth), and steering of the vehicle.

BRIEF DESCRIPTION OF THE DRAWINGS

Further features of the present invention will become apparent to those skilled in the art to which the present invention relates from reading the following specification with reference to the accompanying drawings, in which:

FIG. 4 is an enlarged cross sectional view of FIG. 3 taken approximately along line 4—4 of FIG. 3;

FIG. 5 is an enlarged cross sectional view of FIG. 4, taken approximately along line 5—5 of FIG. 4;

DESCRIPTION OF PREFERRED EMBODIMENTS

Figure 1:
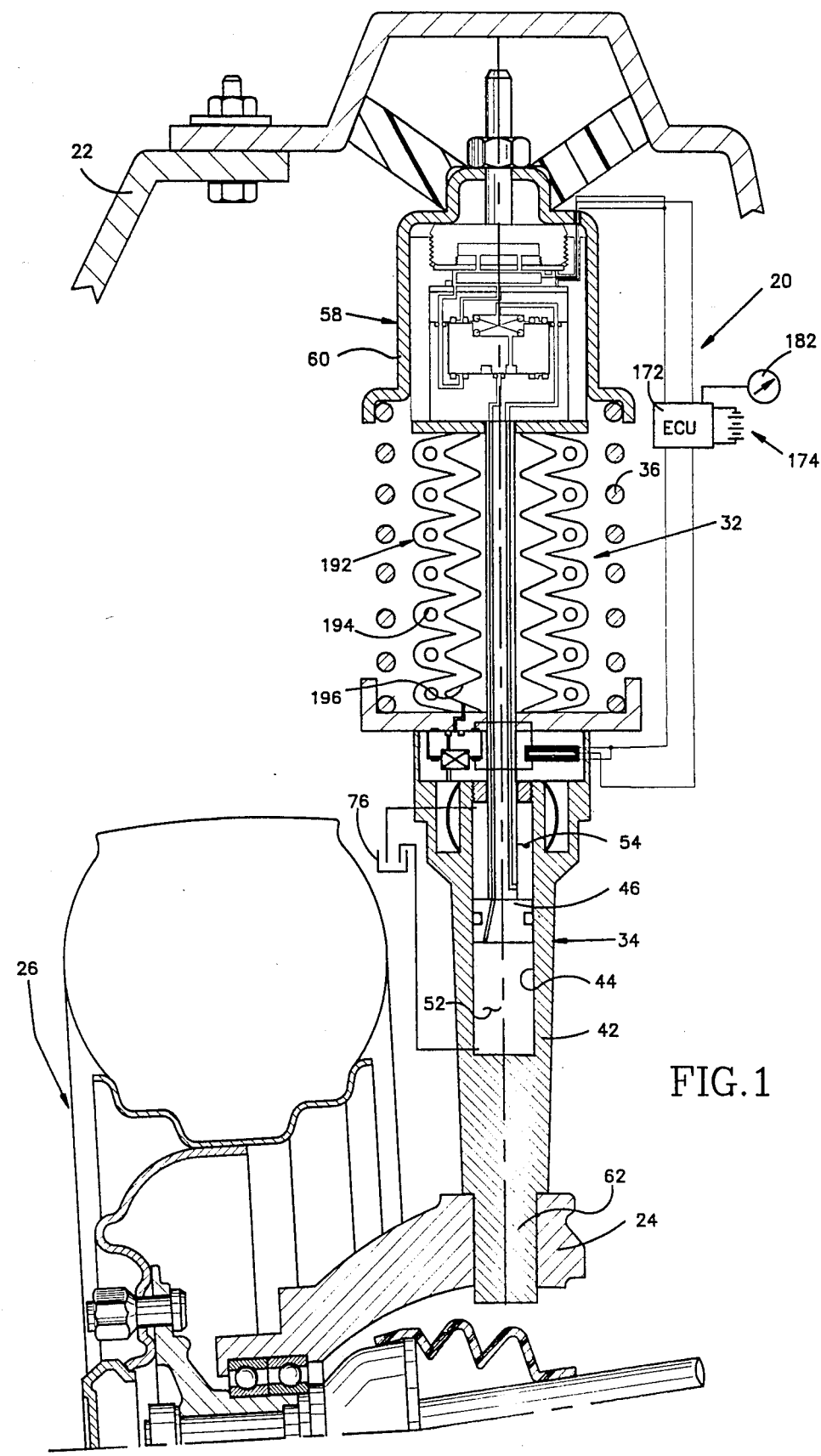
FIG. 1 is a cross sectional view of a vehicle strut, according to the present invention.

The present invention relates to controlling the damping rate of fluid shock absorbers, the spring rate of fluid springs and the like. The specific construction and use of the shock absorber or fluid spring may vary. For purposes of illustration and example, the present invention is shown in FIG. 1 as embodied in a vehicle suspension strut 20. The strut 20 is connected with relatively movable vehicle parts 22, 24. The strut 20 is connected at an upper end portion, as viewed in FIG. 1, with one of the relatively movable parts 22, such as a portion of the frame of the vehicle. A lower end portion of the strut 20 is connected to the other of the relatively movable parts 24, such as a spindle for the wheel assembly 26.

The strut 20 includes a fluid spring 32 and a fluid shock absorber 34. The fluid spring 32 resists compression of the strut 20 due to movement of the relatively movable parts 22, 24 from an initial relative position, as illustrated in FIG. 1, toward each other. The fluid spring 32 has a controllable spring rate. The fluid spring 32 may be used alone or to supplement the spring rate of a conventional spring 36.

The shock absorber 34 is shown as part of the strut 20. However, it will be apparent that the shock absorber 34 may be separate from the fluid spring 32. The shock absorber 34 damps relative movement between the parts 22, 24. That is, the shock absorber 34 controls the rate at which the parts 22, 24 may move relative to one another. The shock absorber 34 has a controllable damping rate. The damping rate of the shock absorber 34 is controllable independently of the spring rate of the fluid spring 32.

The shock absorber 34 has a lower housing or cylinder 42. The cylinder 42 has an inner surface which defines a fluid chamber 44. The fluid chamber 44 is cylindrical and extends coaxially within the cylinder 42. A piston 46 is located in the fluid chamber 44 and divides the fluid chamber into a first variable volume chamber portion 52 and a second variable volume chamber portion 54. The piston 46 has an annular groove 56 (FIG. 3) formed in its outer periphery. A seal 62 is located in the groove 56 to prevent fluid leakage along the outer periphery of the piston 46 between the chamber portions 52, 54.

The piston 46 and cylinder 42 are relatively movable in compression and expansion strokes to damp relative movement of the parts 22, 24. The piston 46 is axially movable within the cylinder 42 to vary the volume in the chamber portions 52, 54. The piston 46 and cylinder 42 move relatively in a compression stroke when the parts 22, 24 move toward each other which decreases the volume in the chamber portion 52 and increases the volume in the chamber portion 54. The piston 46 and cylinder 42 move relatively in an expansion stroke when the parts 22, 24 move away from each other which increases the volume in the chamber portion 52 and decreases the volume in the chamber portion 54.

The piston 46 is connected with the part 22 through a piston rod 64. The piston rod 64 is fixed at a first axial end 66 to the piston 46. The piston rod 64 extends upwardly from the piston 46 through the fluid spring 32, as viewed in FIGS. 1–3. A second axial opposite end 68 of the piston rod 64 is connected to a valve housing 84. The valve housing 84 is attached to a support housing 60 in the upper portion 58 of the strut 20. The support housing 60 is connected with the part 22. Thus, the piston 46 is connected with the part 22. The cylinder 42 has a portion 62 which connects the cylinder to the part 24. Thus, relative movement of the parts 22, 24 causes the piston 46 to move axially within the cylinder 42.

A relatively incompressible hydraulic fluid is disposed in the first and second chamber portions 52, 54. A fluid passage 72 extending axially through the piston rod 64 and piston 46 is in fluid communication with the first fluid chamber 52. A fluid passage 74 also extending axially through the piston rod 64 is in fluid communication with the second chamber portion 54. The passages 72, 74 extend into the lower end, as viewed in FIG. 3, of a valve assembly 82 in the housing 84. As the piston 46 moves axially downwardly within the cylinder 42 during a jounce or compression stroke of the strut 20, from the position illustrated in FIG. 1 to the position illustrated in FIG. 2, the volume of the first chamber portion 52 decreases and the volume of the second chamber portion 54 increases. Decreasing the volume of the first chamber portion 52 during a compression stroke, tends to force the hydraulic fluid to flow from the first chamber portion through the passage 72, through the valve assembly 82 to the passage 74 and into the second chamber portion 54. The first chamber portion 52 decreases in volume at a faster rate than the second chamber portion 54 increases in volume, due to the volume occupied by the piston rod 64. Thus, hydraulic fluid also may flow into a known reservoir 76, which is illustrated schematically.

Figure 2:
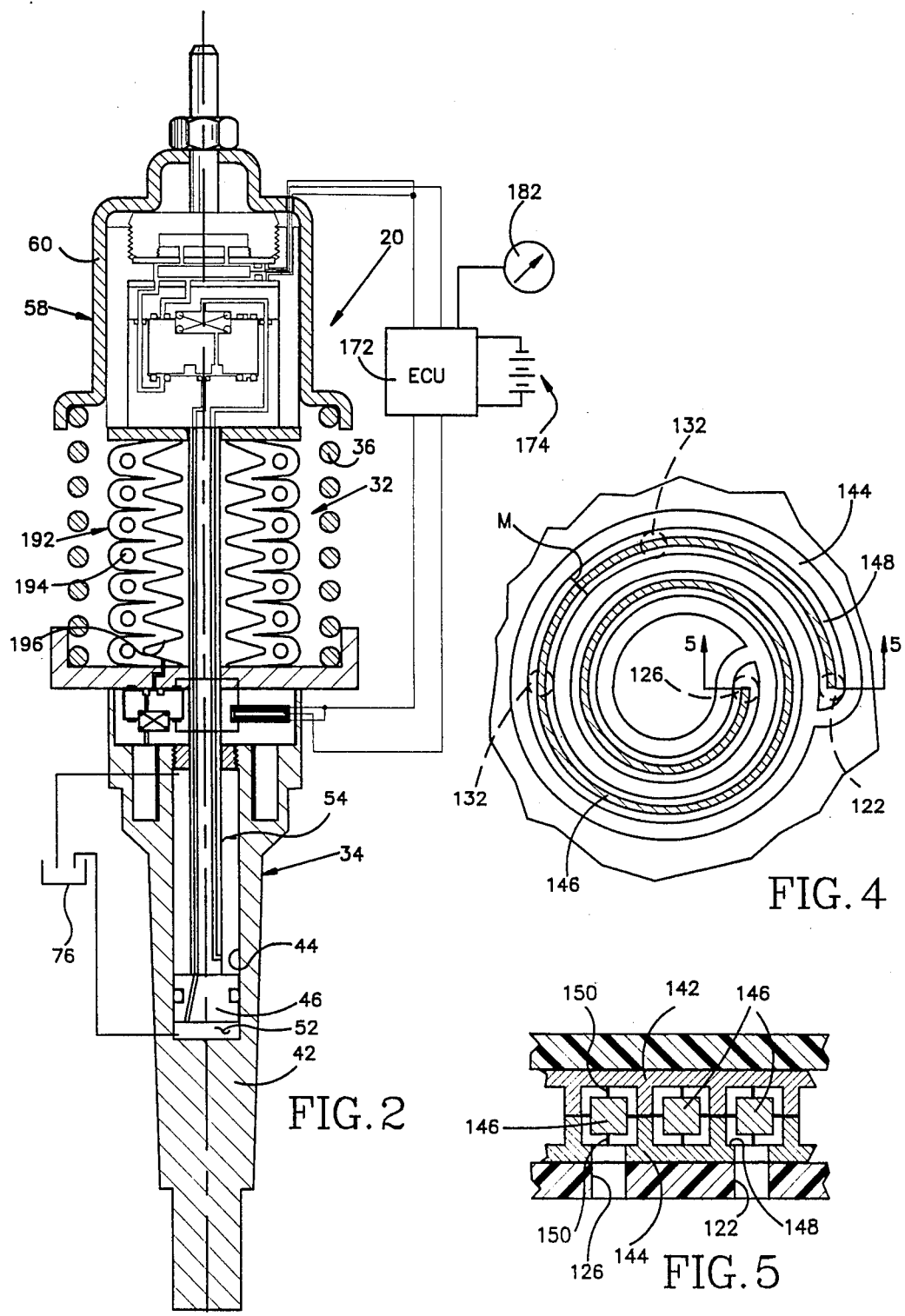
FIG. 2 is a cross sectional view of the strut in FIG. 1 in a compressed condition.

When the piston 46 moves upwardly within the cylinder 42 during rebound or extension of the strut 20, from the position illustrated in FIG. 2 to the position illustrated in FIG. 1, the volume of the first chamber portion 52 expands and the volume of the second chamber portion 54 decreases. Decreasing the volume of the second chamber portion 54 tends to force the hydraulic fluid to flow from the upper chamber portion through the passage 74, through the valve assembly 82, to the passage 72 and into the first chamber portion 52. Hydraulic fluid is also drawn into the first chamber portion 52 from the reservoir 76, in a known manner, because its volume expands at a faster rate than that of the second chamber portion 54.

The flow of the hydraulic fluid between the chamber portions 52, 54 during compression and extension of the strut 20 effects damping of the relatively movable parts 22, 24. When the flow of the hydraulic fluid between the chamber portions 52, 54 is unrestricted, little or no damping of the relative movement of the parts 22, 24 occurs. The damping rate of the shock absorber 34 is, thus, solely dependent upon the resistance to flow created in the passages 72, 74 and valve assembly 82. When the flow of the hydraulic fluid between the chamber portions 52, 54 is restricted during compression or extension of the strut 20, damping of the relative movement of the parts 22, 24 increases as a function of the amount of restriction to the flow of the hydraulic fluid.

The valve assembly 82 (FIG. 3) controls the flow of hydraulic fluid between the passages 72, 74 which, in turn, controls the flow of hydraulic fluid between the chamber portions 52, 54 and, thus, the damping rate of the strut 20. The valve assembly 82 includes a valve member 86 which is located in a valve bore 88 in the valve housing 84. The valve member 86 is axially movable within the valve bore 88. The axial movement of the valve member 86 is limited to a relatively small distance. When the valve member 86 moves within the bore 88, seals 162, 164 located in respective annular chambers 114, 116 expand or compress, respectively, with the expansion and contraction of the annular chambers as the valve member 86 moves within the bore 88 to maintain sealing contact. The passage 72 communicates with the lower end of the valve bore 88, as viewed in FIG. 3. A spring 92 exerts a force which biases the valve member 86 against a lower surface 94 of the valve bore 88 to normally block the flow of hydraulic fluid to or from the passage 72.

Figure 3:
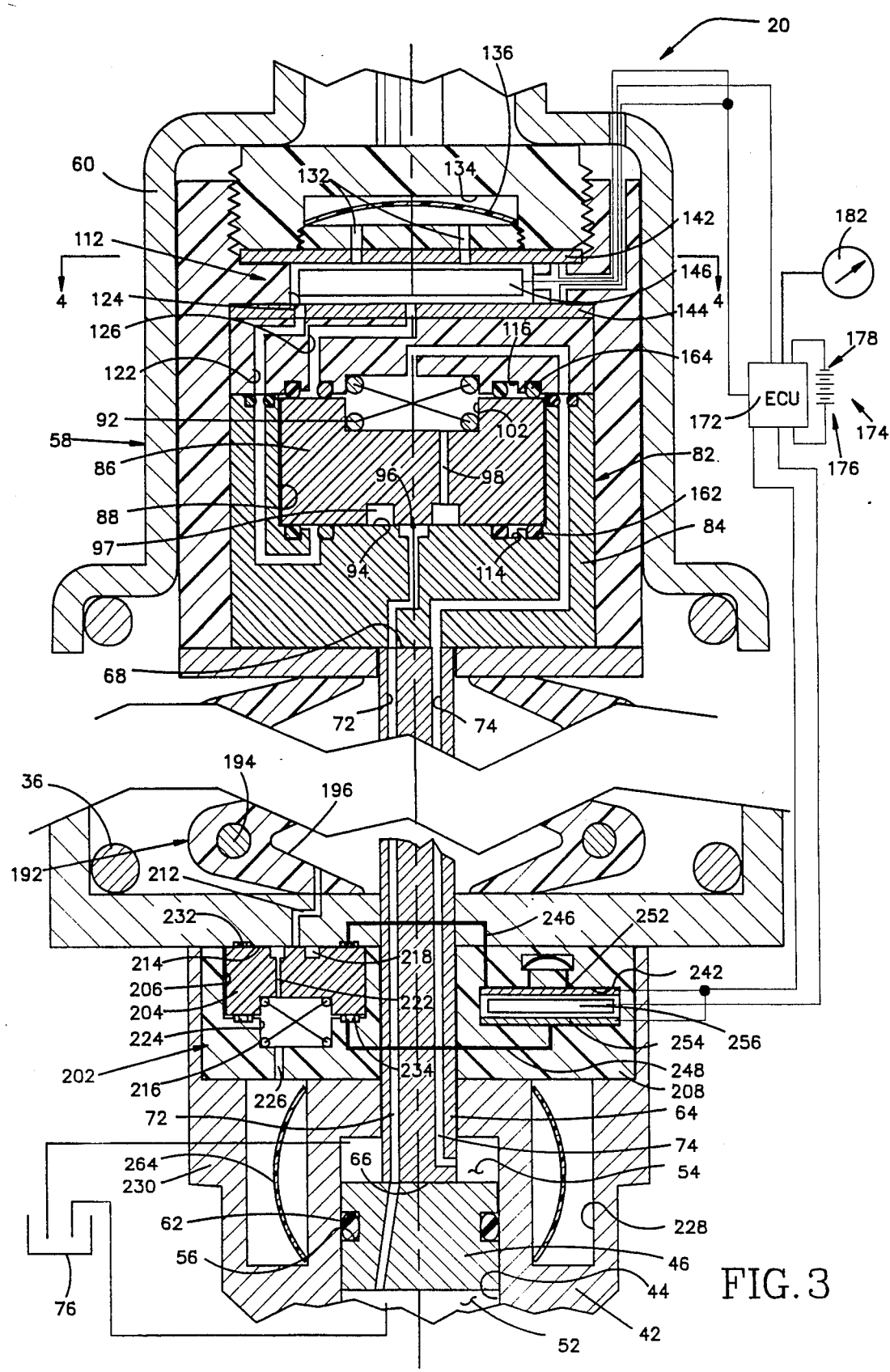
FIG. 3 is an enlarged cross sectional view with parts omitted of portions of the strut of FIG. 1.

During a compression stroke of the strut 20, fluid pressure in the first chamber portion 52 is increased by the piston 46 moving axially downward, as viewed in FIG. 3, within the cylinder 42. When the fluid pressure has built up a sufficient amount within the first chamber 52 and the passage 72, the fluid pressure acts against the surface 96 of the valve member 86 to move the valve member axially upward against the biasing force of the spring 92. The valve member 86 is moved to an open position, illustrated in FIG. 6, in which hydraulic fluid flows from the passage 72. The hydraulic fluid flows from the passage 72 to an annular chamber 97 in the valve member 86 and then into a passage 98 in the valve member. The passage 98 communicates with a chamber 102 for the spring 92. The chamber 102 communicates with the passage 74. Thus, during a compression stroke of the strut 20, when the fluid pressure in the first chamber 52 and passage 72 unseats the valve member 86 from the surface 94, flow of hydraulic fluid is permitted to the passage 74 and second chamber 54.

The movement of the valve member 86 against the biasing force of the spring 92 establishes a fixed damping rate of the shock absorber 34. In order to provide a variable damping rate of the shock absorber 34, according to the present invention, an electrorheological fluid control device 112 (FIG. 3) is provided in the valve assembly 82. The electrorheological fluid control device 112 controls movement of the valve member 86 by controllably supplementing the force exerted by the spring 92 to resist movement of the valve member from the closed position. Thus, the amount of fluid pressure in the passage 72 required to unseat the valve member 86 must increase in proportion to the force added by the electrorheological fluid control device 112.

The electrorheological fluid control device 112 includes the pair of annular chambers 114, 116 disposed in the valve housing 84 at axially opposite ends of the valve member 86. A passage 122 connects the annular chamber 114 with an electrorheological fluid chamber 124. Another passage 126 connects the annular chamber 116 with the electrorheological fluid chamber 124. A pair of passages 132 connect the electrorheological fluid chamber 124 with a compliance chamber 134.

Electrorheological fluid is disposed in the chambers 114, 116, 124, 134 and passages 122, 126, 132. A resilient diaphragm 136 is disposed in the compliance chamber 134. The diaphragm 136 exerts a slight amount of pressure to the electrorheological fluid to prevent any voids and induce a flow of the electrorheological fluid within the chambers 114, 116, 124, 134 and passages 122, 126, 132. Thus, as the valve member 86 moves, the electrorheological fluid flows within the passages 122, 126, 132 and chambers 114, 116, 124, 134 to fill expanding volumes in either annular chamber 114 or 116.

The viscosity of the electrorheological fluid varies as a function of the magnitude of an electrical field applied to the electrorheological fluid, as is known. A pair of electrically conductive plates 142, 144 are disposed within the electrorheological fluid chamber 124. The plates 142, 144 are formed to define a spiral passage 148 (best seen in FIGS. 4 and 5). The passage 148 communicates at opposite ends with the passages 122, 126. The passages 132 are disposed on either side of the linear midpoint M of the spiral passage 148.

An electrically conductive rod 146, formed in a corresponding spiral configuration, is disposed in the passage 148 between the pair of plates 142, 144. Insulators 150 space the rod 146 from the pair of plates 142, 144. A portion of the electrorheological fluid is disposed between the conductive plates 142, 144 and the rod 146 in the passage 148. Thus, a relatively large surface area of the plates 142, 144 and rod 146 is provided within the fluid passage 148 to act on the electrorheological fluid. When an electrical field is applied across the plates 142, 144 and rod 146, the viscosity of the electrorheological fluid between the plates and rod varies as a function of the magnitude of the electrical field.

By increasing the viscosity of the electrorheological fluid disposed between the plates 142, 144 and rod 146, the flow of electrorheological fluid through the passage 148 and thus the passages 122, 126 is restricted. For example, if electrorheological fluid flow is restricted in the passage 126, then flow of the electrorheological fluid from the annular chamber 116 is also restricted. The electrorheological fluid in the annular chamber 116, thus, acts to resist movement of the valve member 86 in a direction which would allow hydraulic fluid to flow from the passage 72. As the viscosity of the electrorheological fluid increases, flow of the electrorheological fluid through the passages 126, 148 decreases. The resistance to movement of the valve member 86 under the influence of fluid pressure from the chamber portion 52 and passage 72 increases. Thus, the damping rate of the shock absorber 34 is variable as a function of the viscosity of the electrorheological fluid located in the passage 148.

The electrorheological fluid changes viscosity only between the plates 142, 144 and rod 146, therefore, only flow through the passage 148 is restricted. The viscosity of the electrorheological fluid in the passages 122, 126 does not change. Thus, the resistance to movement of the valve member 86, from the closed position of FIG. 3 to the open position of FIG. 6, is accomplished by the relative incompressibility of the electrorheological fluid trapped in the passage 126 and the annular chamber 116.

Damping relative movement of the parts 22, 24 may also occur during an extension stroke of the strut 20, from the position in FIG. 2 to the position in FIG. 1.

Figure 6:
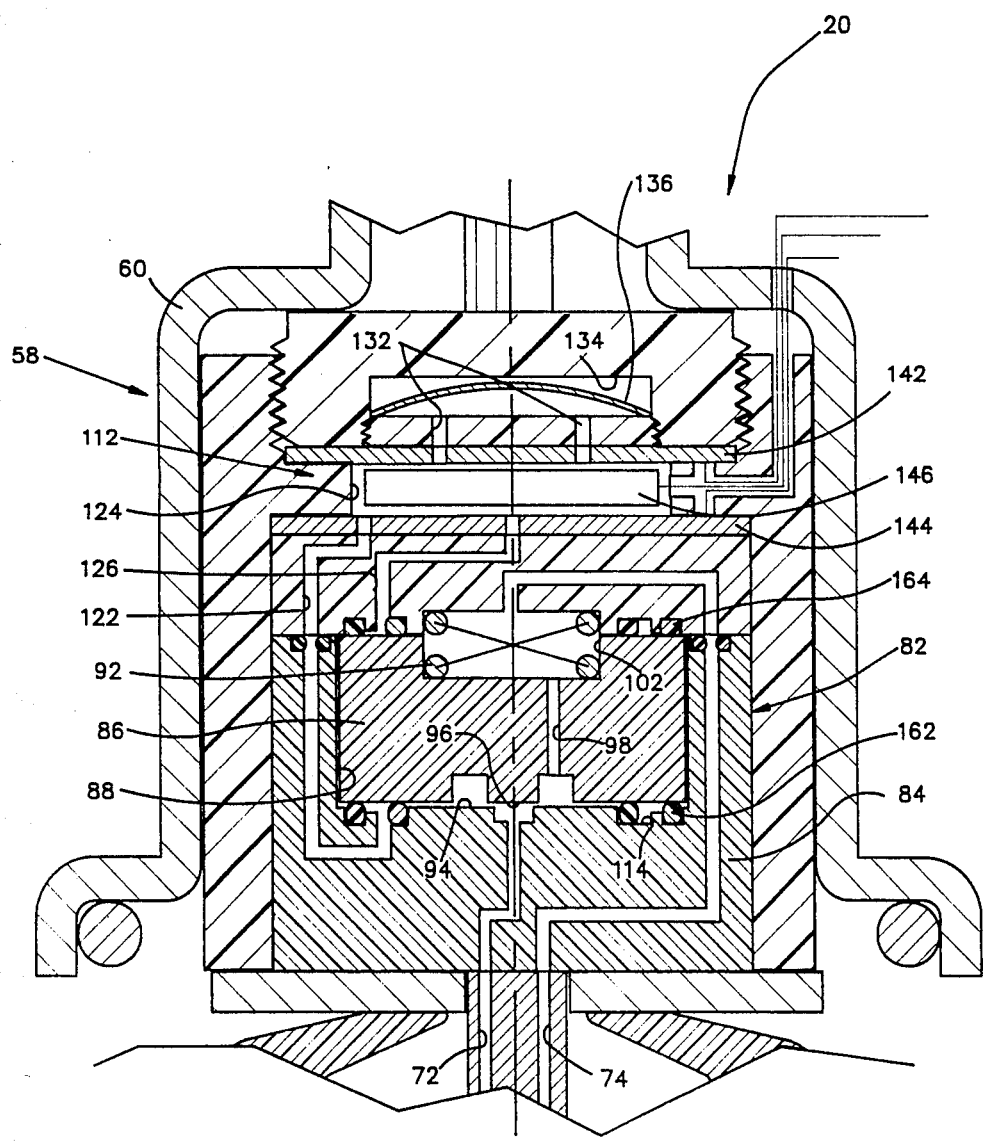
FIG. 6 is a view of a portion of the strut shown in FIG. 3 and illustrating parts in a different position.

Once the valve member 86 has moved to the open position illustrated in FIG. 6, fluid flow is permitted between the passages 72, 74 and the chamber portions 52, 54. The valve member 86 is desirably maintained in the open position so that hydraulic fluid may freely flow between the chamber portions 54, 52 to allow the parts 22, 24 to move relatively away from one another with little damping of the movement.

The electrorheological fluid located in the annular chamber 114 is used to block the valve member 86 from moving from the open position towards the closed position. This is accomplished by maintaining the electric field applied to the electrorheological fluid in the passage 148 or by applying another electrical field to the electrorheological fluid. The electrorheological fluid in the passage 122 and annular chamber 114 is thus restricted from flowing which tends to prevent the force of the spring 92 from closing the valve member 86. During extension of the strut 20, the magnitude of the electrical field applied to the electrorheological fluid in the passage 148 should be relatively large to prevent any movement of the valve member 86 towards the closed position. The electrorheological fluid in the annular chamber 114 will be allowed to flow through passage 122 to permit the valve member 86 to close by reducing the electrical field applied to the electrorheological fluid in the passage 148. It will be apparent that the electrorheological fluid control device 112 can be controlled by discontinuing and then reapplying the electrical field to permit the valve member 86 to move to a position between the fully opened and fully closed positions in order to effect a desired damping of the parts 22, 24 during extension of the strut 20.

An electronic control unit (ECU) 172 (FIG. 3) is connected with the plates 142, 144 and rod 146 to apply the electrical field to the electrorheological fluid in the passage 148. The ECU 172 includes a known processor, memory and communication interfaces. The ECU 172 controls the magnitude of the electrical field applied so the viscosity of electrorheological fluid can vary from a very fluid condition to virtually a solid condition. The ECU 172 is also connected with a power source 174, such as a vehicle battery or alternator. The ECU 172 controllably connects a positive pole 176 of the power source 174 to the plates 142, 144. The ECU 172 connects a negative pole or ground terminal 178 of the power source 174 to the rod 146. The ECU 172 will apply a positive potential to the plates 142, 144 of a specific magnitude. A specific magnitude electrical field is applied to the electrorheological fluid in the passage 148 when a control program, residing in the memory of the ECU 172, determines a specific desired viscosity of the electrorheological fluid is needed.

The ECU 172 varies the magnitude of the electrical field applied across the plates 142, 144 and rod 146 as a function of receiving a signal from at least one sensor 182. The sensor 182 senses a condition of the parts 22, 24 or strut 20 and generates a signal indicative of the condition. The signal is communicated to the ECU 172 for processing by the control program. For example, the sensor 182 may sense the speed of the vehicle, if steering of the vehicle is occurring, if braking is occurring, the condition of the road upon which the vehicle is travelling, or the relative length of the strut 20. It will be apparent that more than one sensor 182 can be used to detect various conditions of the strut 20 or parts 22, 24 and which will relay the conditions to the ECU 172. The ECU 172 is programmed to respond to the input of the sensor or sensors 182 to determine the magnitude of the electrical field to be applied to the electrorheological fluid in the passage 148. Thus, the ECU 172 is programmed to control the damping rate of the strut 20 as a function of changing conditions of the road, the vehicle parts 22, 24 or the strut 20.

The spring rate of the fluid spring 32 of the strut 20 is also controllable. The fluid spring 32 (FIG. 1) includes a bellows 192. The bellows 192 is made of a resilient elastomeric material and can be extended or contracted during movement of the strut 20. The bellows 192 has a spring 194 molded into crests of the bellows. The spring 194 biases the bellows 192 to an extended condition.

The bellows 192 has an interior surface defining a variable volume chamber 196 which contains hydraulic fluid. The volume of the hydraulic fluid in the chamber 196 of the fluid spring 32 determines the spring rate, or resistance to compression of the strut 20. Upon a sufficient compressive force to overcome the additive spring rate of the fluid spring 32, spring 36 and spring 194, the strut 20 and fluid spring will compress from the initial position illustrated in FIG. 1 to the position illustrated in FIG. 2.

Figure 7:
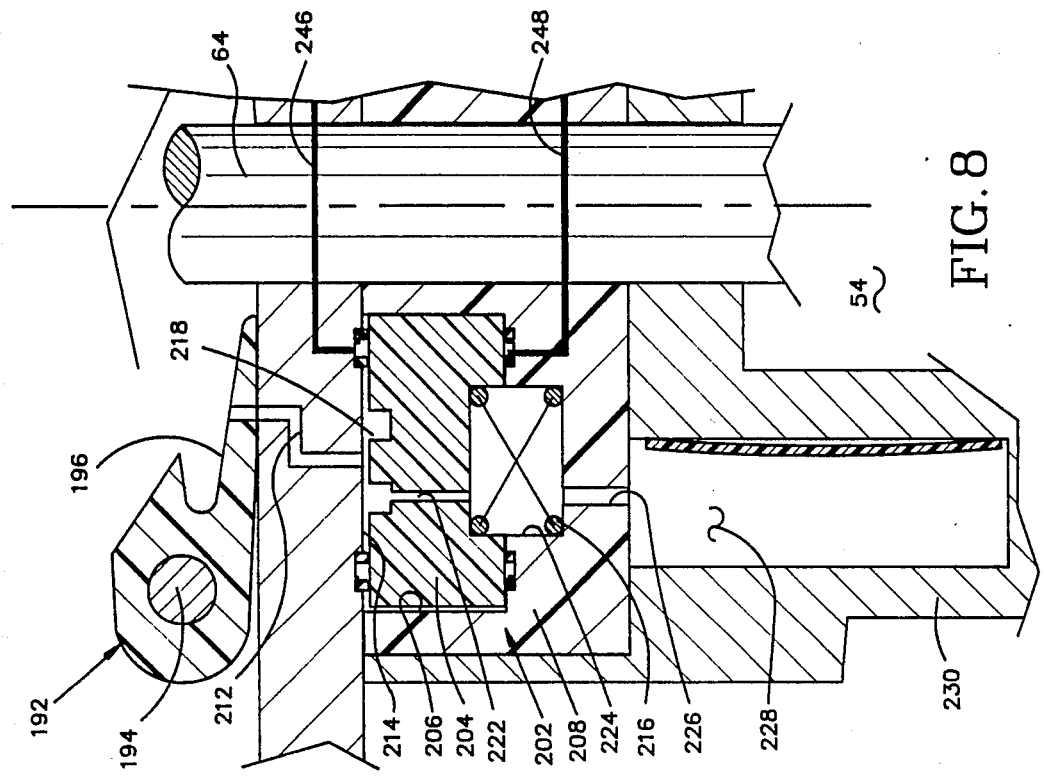
FIGS. 7 and 8 are enlarged views of another portion of the strut of FIG. 3 showing parts thereof in different positions.

During compression of the strut 20, fluid pressure within the chamber 196 of the fluid spring 32 increases. The flow of hydraulic fluid from the chamber 196 due to this build up of fluid pressure is resisted by a valve assembly 202 (FIG. 3). The valve assembly 202 is similar to the valve assembly 82 described above for the shock absorber 34. The valve assembly 202 includes a movable valve member 204 (FIG. 7) disposed within a valve bore 206 in a valve housing 208. The chamber 196 is in fluid communication with the valve bore 206 through a passage 212. The valve member 204 is normally biased against an end surface 214 of the bore 206 by a spring 216 to close the passage 212 and to block the flow of hydraulic fluid from the chamber 196.

When the fluid pressure in the chamber 196 and passage 212 acting on the valve member 204 exceeds the biasing force of the spring 216, the valve member 204 moves away from the surface 214 to an open position. This axial movement of the valve member 204 permits hydraulic fluid to flow from the passage 212 to an annular chamber 218 in the valve member 204 to another passage 222 through the valve member. The passage 222 communicates with a chamber 224 for the spring 216 which, in turn, communicates with a passage 226. The passage 226 communicates with a compliance chamber 228 for the hydraulic fluid in an upper portion 230 of the cylinder 42. The compliance chamber 228 has a flexible diaphragm 264 which pressurizes the hydraulic fluid in passages 222, 226 and chambers 218, 224 so hydraulic fluid may enter the chamber 196 when the fluid spring 32 extends and the valve member 204 is in the open position. The spring 216 normally biases the valve member 204 upwardly against the surface 214 of the bore 206 to prevent fluid flow through the passage 212 from the chamber 196. The force of the spring 216 biasing the valve member 204 to a closed position is overcome when the hydraulic fluid pressure in the chamber 196 and passage 212 increases due to the volume of the chamber 196 decreasing.

A pair of annular chambers 232, 234 are located in the valve housing 208 at axially opposite ends of the valve member 204. The annular fluid chamber 232 is connected with an electrorheological fluid chamber 242 (FIG. 3) through a passage schematically illustrated as 246. The annular chamber 234 is connected with the electrorheological fluid chamber 242 by another passage 248. A pair of plates 252, 254 are disposed within the electrorheological fluid chamber 242. The plates 252, 254 are formed to define a spiral passage, as described above. A rod 256, formed in a spiral configuration is disposed in the passage defined by the plates 252, 254. A portion of electrorheological fluid is disposed between the plates 252, 254 and rod 256. The construction of the rod 256 and plates 252, 254 is identical to that illustrated in FIGS. 4 and 5 and described above, and therefore will not be described in further detail.

Figure 8:
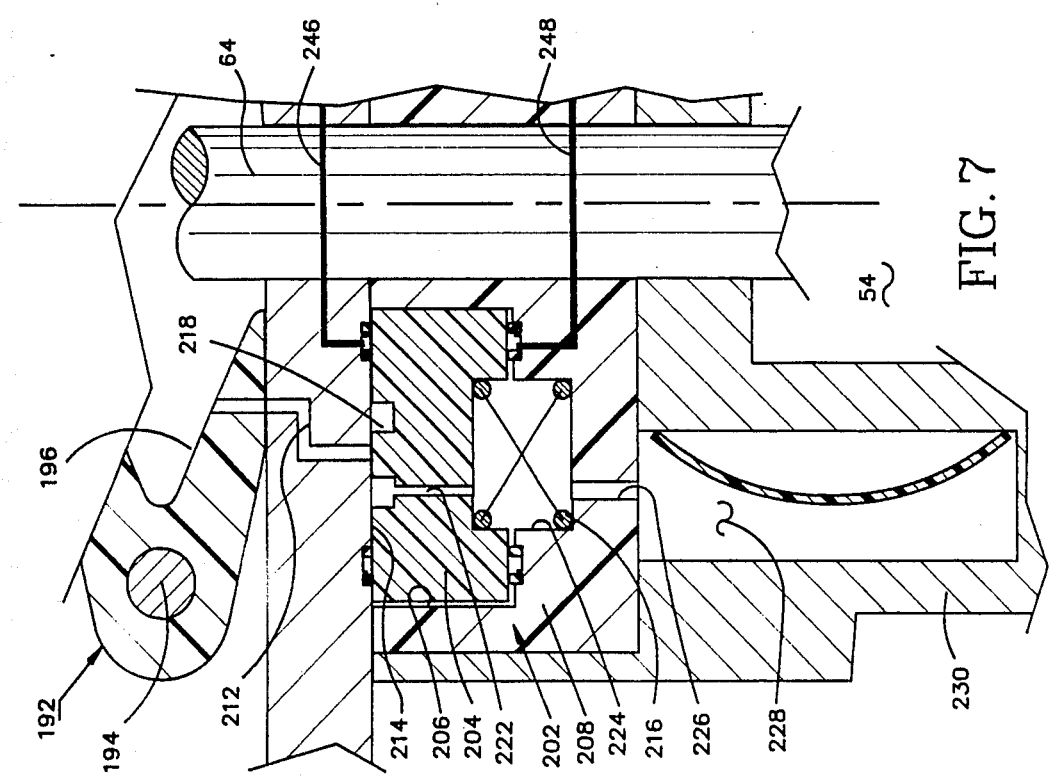

When an electrical field is applied to the electrorheological fluid disposed between the plates 252, 254 and rod 256, the viscosity of the portion of the electrorheological fluid disposed therebetween varies as a function of the magnitude of the electrical field. When the viscosity of electrorheological fluid disposed in the passage increases, flow of electrorheological fluid from the annular chamber 232 is restricted. When the flow of electrorheological fluid from the annular chamber 232 is restricted, the force resisting movement of the valve member 204 to an open position, as illustrated in FIG. 8, increases.

The plates 252, 254 and rod 256 are electrically connected with the ECU 172 (FIG. 3). The ECU 172 controls the application and magnitude of the electrical field to the plates 252, 254 and rod 256 to vary the viscosity of the electrorheological fluid between the plates and thereby controls the movement of the valve member 204 which controls the spring rate of the fluid spring 32. The ECU 172 controls the electrical field applied to the plates 252, 254 and rod 256 in response to receiving a signal from the sensor 182, as described above. Further sensors may be included which are directed to sensing conditions related to the fluid spring 32. For example, the sensors may sense vehicle loading, which is communicated to the ECU 172. A higher spring rate of the fluid spring 34 can be effected to offset higher loading and maintain the vehicle in a level attitude by increasing the amount of hydraulic fluid delivered from the compliance chamber 228 during extension of the fluid spring 32 which increases the volume of the chamber 196.

It will be apparent that the ECU 172 may simultaneously control both the spring rate of the fluid spring 32 and the damping of the shock absorber 34 or may control them independently of one another. The only limitations placed upon the ECU 172 are those of the control program written for the ECU 172. Thus, variable control of the damping and spring rates of the strut 20 is accomplished by using a relatively small amount of electrorheological fluid.

Figure 10:
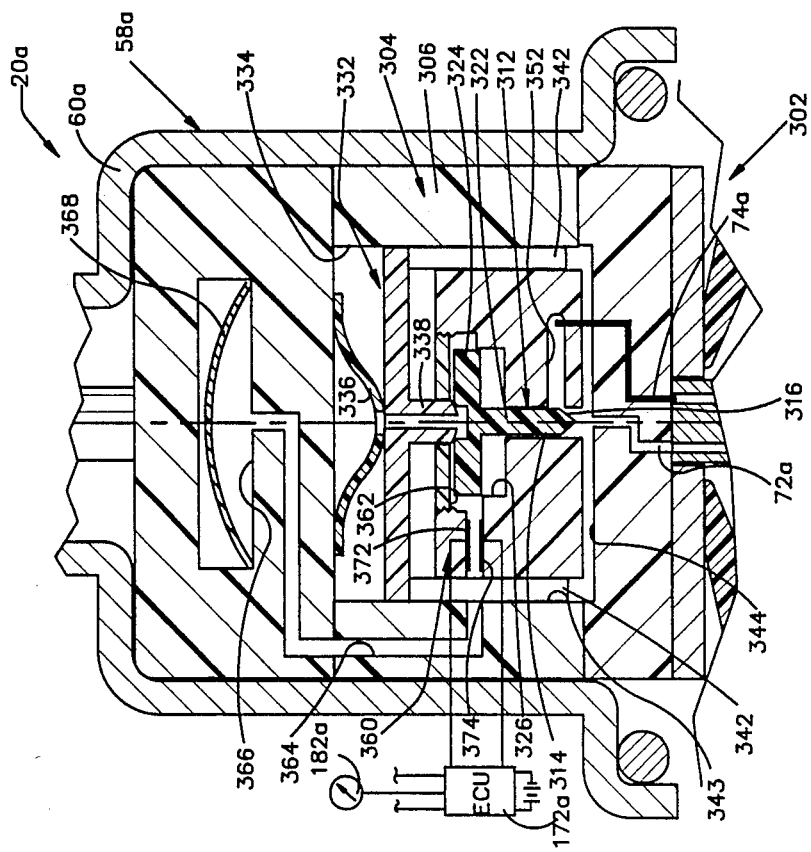
FIGS. 9 and 10 are cross sectional views of a second embodiment of the present invention illustrating parts in different positions.
Figure 9:
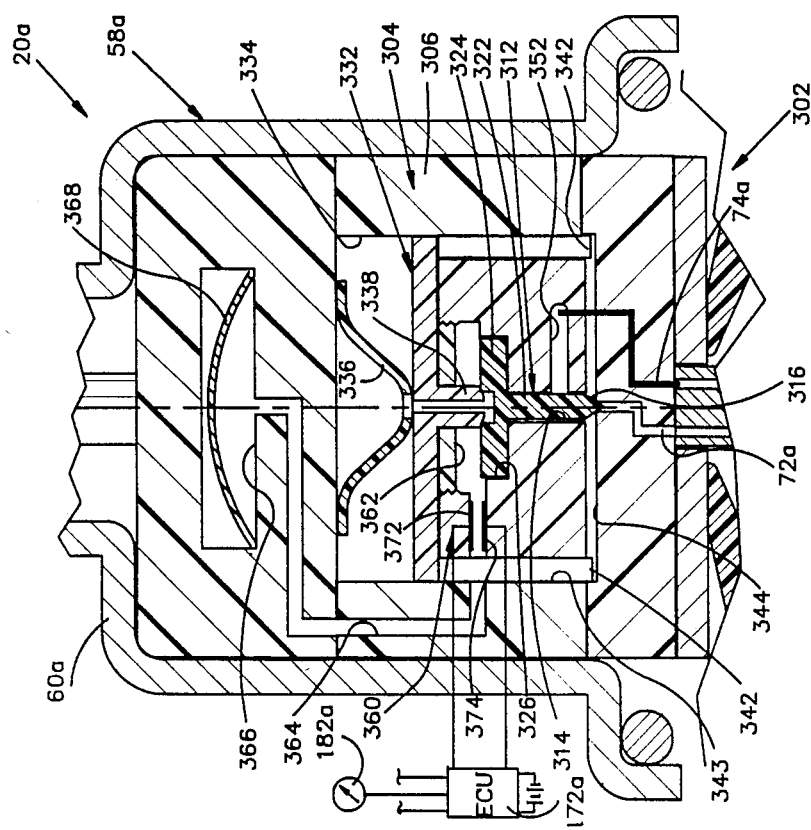

A second embodiment of a shock absorber, made in accordance with the present invention, is illustrated in FIGS. 9 and 10. The second embodiment is similar to the first embodiment and includes the fluid spring (not shown and as described above) and a shock absorber 302. The shock absorber 302 includes the piston, piston rod and cylinder, as described above.

A valve assembly 304 is mounted in a housing 306 in the upper portion 58a of the strut 20. The valve assembly 304 includes a movable valve member 312 disposed within a valve bore 314 in the valve housing 306. The valve member 312 has a tapered conical end surface 316 for blocking the flow of hydraulic fluid from the passage 72a. The valve member 312 also includes a spindle portion 322 and a disc portion 324 supported in a stepped bore 326 in the valve housing 306. A support plate 332 is received in another bore 334 in the housing 306 and is biased by the force of a spring 336 so a projection 338 of the support plate engages the disc portion 324 of the valve member 312. The force of the spring 336 biases the valve member 312 to a position in which the flow of hydraulic fluid between passage 72a and 74a is blocked.

Pistons 342 are disposed in bores 343 and have one end connected to the support plate 332. Another end of each of the pistons 342 is exposed to the hydraulic fluid pressure in a chamber 344 which is in fluid communication with the passage 72a. Pressure in the chamber 344 acts on the ends of the pistons 342 to force the pistons and support plate 332 upwardly, as viewed in FIG. 10, against the biasing force of the spring 336. Fluid pressure in the chamber 344 also acts on the tapered end surface 316 of the valve member 312 to move the valve member upwardly in the valve bore 314. When the valve member 312 moves a sufficient amount so the tapered end surface 316 of the valve member is adjacent a passage 352 in the valve housing 306, as illustrated in FIG. 10, hydraulic fluid flow is permitted between the passages 72a and 74a.

An electrorheological fluid control device 360 resists movement of the valve member 312 to the open position. The electrorheological fluid control device 360 supplements the biasing force of the spring 336. The electrorheological fluid control device 360 includes an electrorheological fluid chamber 362 which is located adjacent the disc portion 324 of the valve member 312. The surface area of the disc portion 324 which is exposed to the electrorheological fluid chamber 362 is larger than the surface area of the tapered end surface 316 of the valve member 312 exposed to the hydraulic fluid pressure in the passage 72a. A passage 364 connects the electrorheological fluid chamber 362 with a compliance chamber 366. A diaphragm 368 is disposed in the compliance chamber 366. Electrorheological fluid is disposed in the chambers 362, 366 and passage 364.

A pair of parallel plates 372, 374 are located within the passage 364. When an electrical field is applied across the plates 372, 374, the electrorheological fluid between the plates increases in viscosity as a function of the magnitude of the electrical field. Flow of electrorheological fluid through this portion of the passage 364 is restricted. When flow of the electrorheological fluid is restricted from exiting the electrorheological fluid chamber 362, movement of the valve member 312 to the open position is resisted. Since the surface area of the disc portion 324 of the valve member 312 on which the electrorheological fluid acts is larger than that of the surface area of the end portion 316 of the valve member on which the hydraulic fluid acts, a lower pressure in the electrorheological fluid chamber 362 is sufficient to overcome the force due to the hydraulic fluid pressure acting on the end portion of the valve member.

The ECU 172a connects the plate 372 with the negative pole or ground terminal of the power source. The ECU 172a also connects the positive pole of the power source with the plate 374. The ECU 172a controls the magnitude of the electrical field applied to the plates 372, 374 in the passage 364. The ECU 172a is programmed to apply the electrical field in response to signals received from the sensor 182a indicative of a condition of the parts 22a, 24a, or 20a. The viscosity of the electrorheological fluid disposed between the plates 372, 374 varies as a function of the magnitude of the electrical field applied thereto. Thus, when no electrical field is applied, flow of the electorheological fluid is not restricted through the passage 364. When a relatively large electrical field is applied to the plates 372, 374, the viscosity of electrorheological fluid significantly increases which restricts the flow of the electrorheological fluid from the electrorheological fluid chamber 362.

When damping relative movement of parts 22a, 24a is completed, the pressure acting on the end portion 316 of the valve member 312 decreases and the valve member returns to the closed position under the bias force of the spring 336. The piston moves within the cylinder and rebound action of the shock absorber 302 is controlled through a conventional hydraulic blow-off valve (not shown) carried by the piston 46 in the cylinder 42.

Figure 11:
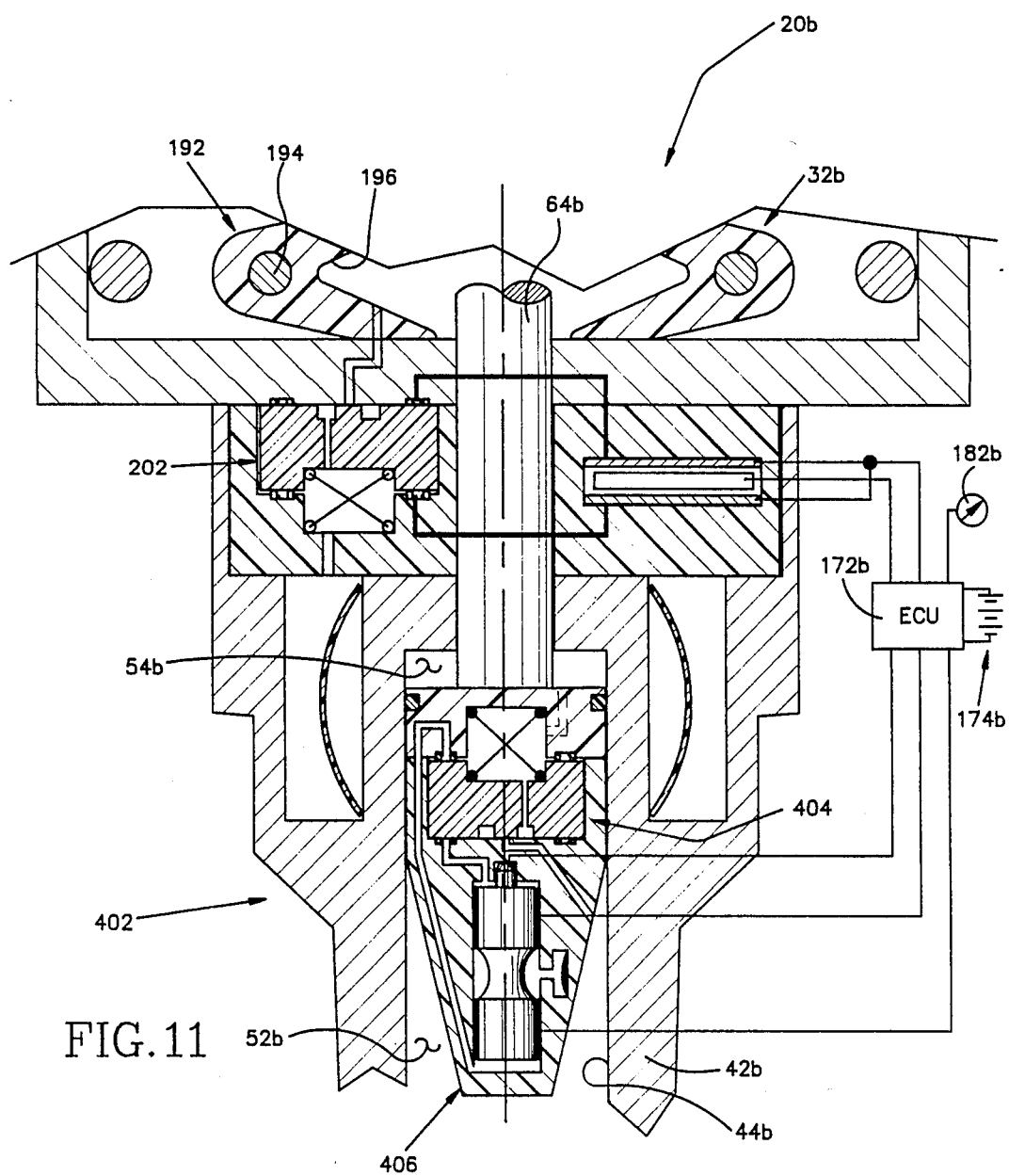
FIG. 11 is a schematic cross sectional view illustrating a third embodiment of the present invention.

A third embodiment of the shock absorber, according to the present invention, is illustrated in FIG. 11. The shock absorber 402 of the third embodiment has a valve assembly 404 carried by a piston 406. The piston 406 is movable axially within the cylinder 42b of the strut 20b. During compression or extension of the strut 20b damping of the parts 22b, 24b is effected by the valve assembly 404.

Figure 12:
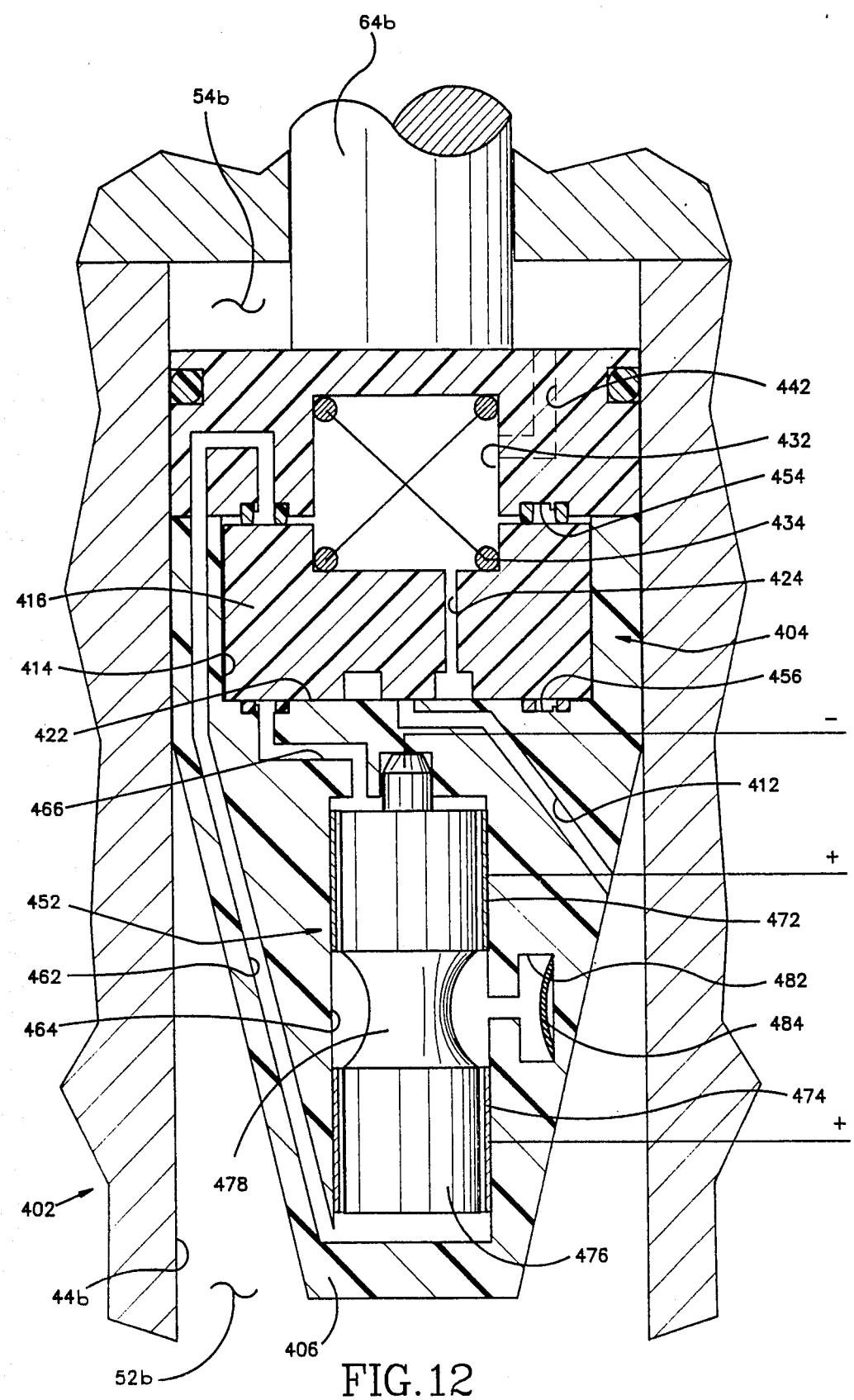
FIGS. 12 and 13 are enlarged cross sectional views of FIG. 11 illustrating parts in different positions.

The valve assembly 404 controls the flow of hydraulic fluid from the first chamber portion 52b to the second chamber portion 54b. Controlling the flow of hydraulic fluid between the chamber portions 52b, 54b controls the damping rate of the strut 20b. A passage 412 (FIG. 12) is located within the piston 406 and communicates the first chamber portion 52b with a valve bore 414 in the piston. A valve member 416 is located in the valve bore 414 and is axially movable a relatively small distance therein. The valve member 416 is illustrated in FIG. 12 as engaging an end surface 422 of the valve bore 414 to block fluid flow from the passage 412 and the first chamber portion 52b.

Figure 13:
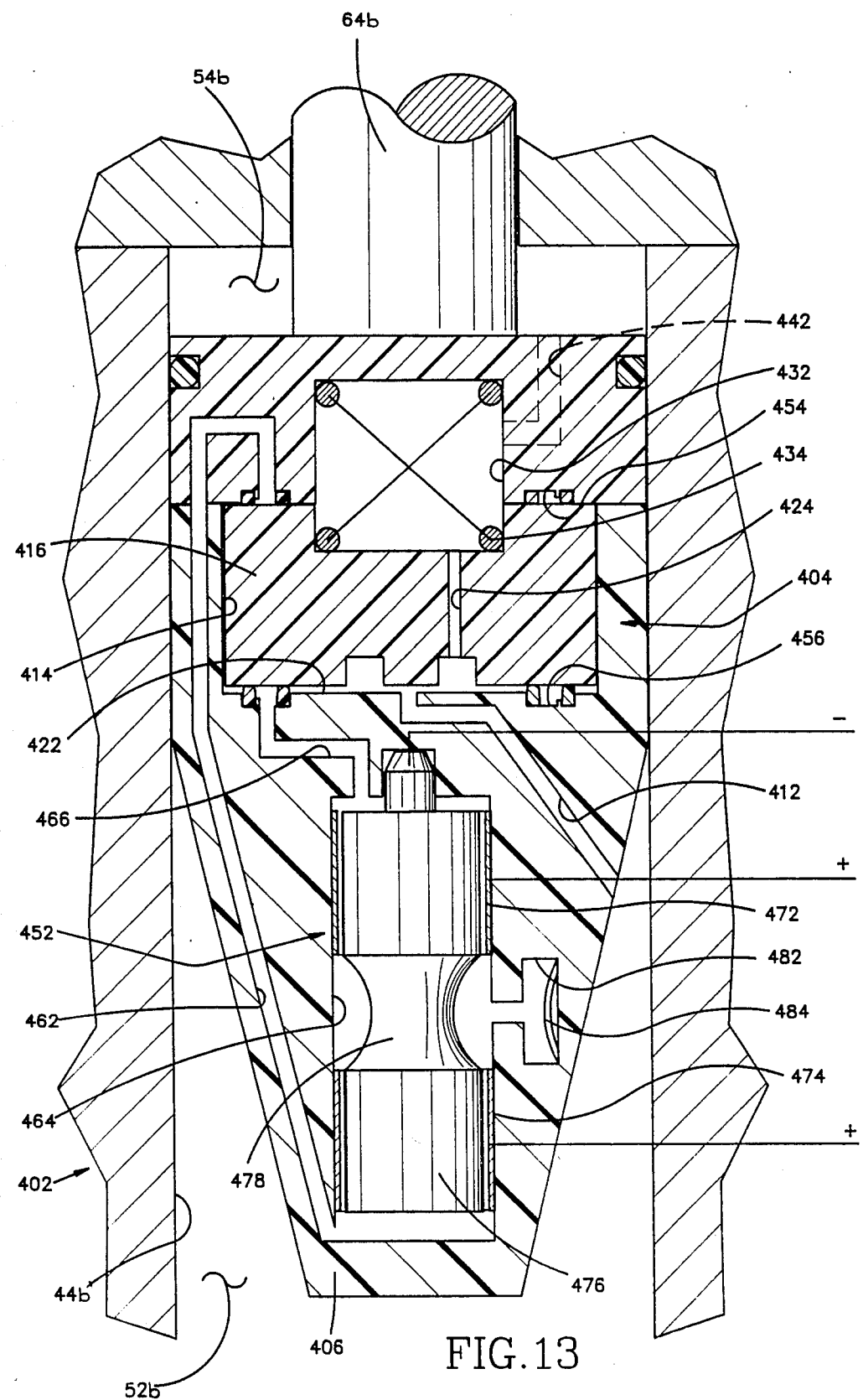

Another passage 424 extends through the valve member 416 and to a chamber 432 for a spring 434. The spring 434 biases the valve member 416 towards the closed position, as illustrated in FIG. 12, against the end surface 422 of the bore 414 to block the flow of hydraulic fluid. Another passage 442 communicates the spring chamber 432 with the second chamber portion 54b. Thus, when the valve member 416 is moved to the open position, as illustrated in FIG. 13, under the influence of hydraulic fluid pressure in the lower chamber portion 52b and passage 412, the hydraulic fluid flows from the first chamber portion to the second chamber portion 54b. The rate of damping the movement of the parts 22b, 24b is, thus, established as a fixed rate by the force exerted by the spring 434 at which the valve member 416 is permitted to move from the closed position.

In order to vary the damping rate, an electrorheological fluid control device 452 carried by the piston 406 supplements the force of the biasing spring 434 by exerting a variable and controllable force resisting movement of the valve member 416. The electrorheological fluid control device 452 includes a pair of annular chambers 454, 456 disposed at axially opposite ends of the valve member 416. A passage 462 connects the upper annular fluid chamber 454 with an electrorheological fluid chamber 464. The lower annular chamber 456 is connected by a passage 466 with the electrorheological fluid chamber 464. Electrorheological fluid is located in the chambers 454, 456, 464 and passages 462, 466.

A pair of electrically conductive tubular members 472, 474 are disposed within the electrorheological fluid chamber 464. The members 472, 474 are located coaxially and axially spaced from one another. An electrically conductive rod 476 is located in the electrorheological fluid chamber 464 and located concentrically within and radially spaced from the tubular plates 472, 474. A portion of the electrorheological fluid is disposed between the members 472, 474 and the rod 476. An intermediate portion 478 of the rod 476 has a smaller diameter than the axially opposite end portions of the rod and permits electrorheological fluid to flow into the electrorheological fluid chamber 464 from a compliance chamber 482. The compliance chamber 482 has a resiliently deformable diaphragm 484 for exerting a force against the electrorheological fluid to cause a slight pressure to fill any voids in the chambers 454, 456, 464 and passages 462, 466.

When flow of the electrorheological fluid from the upper annular chamber 454 through the passage 462 is restricted, movement of the valve member 416 from the closed position, as illustrated in FIG. 12, is prevented to block flow of hydraulic fluid from the first chamber portion 52b to the second chamber portion 54b. Once the pressure in the first chamber portion 52b, during a compression stroke of the strut 20b becomes sufficiently large to move the valve member 416 against the force of the spring 434 and the electrorheological fluid control device 452, the valve member 416 moves to an open position, as illustrated in FIG. 13.

During an extension stroke of the strut 20b, it is desirable to communicate the second chamber portion 54b with the first chamber portion 52b to prevent any damping. This is accomplished by restricting the flow of electrorheological fluid from the lower annular chamber 456 and passage 466 to hold the valve member 416 in the open position. It will be apparent that the valve member 416 could be permitted to partially close, thereby effecting some damping of movement of the parts 22b, 24b during an extension stroke of the strut 20b.

The variable rate damping is effected by applying an electrical field across a portion of the electrorheological fluid disposed between one of the tubular members 472, 474 and the rod 476. The magnitude of the electrical field is controlled to vary the viscosity of the electrorheological fluid as a function thereof. Each of the members 472, 474 is separately connected with the ECU 172b (FIG. 11). The ECU 172b applies a positive potential to only one of the members 472, 474 at a time. The rod 476 is connected with the ECU 172b which connects the negative pole of the power source thereto. For example, electrorheological fluid flow through the passage 462 and the annular chamber 454 can be restricted by applying the electrical field across the member 472 and the rod 476, whereas electrorheological fluid flow through the annular chamber 456 and passage 466 may be permitted by not applying an electrical field across the member 474 and the rod 476. This provides a significant advantage in that flow of electrorheological fluid to only one of the annular chambers 454 or 456 is restricted, while allowing electrorheological fluid communication with the other of the annular chambers.

From the above, it will be apparent that any of the electrorheological fluid control devices can be used to control the fluid spring 32 as well as the shock absorber 34. It will also be apparent that the present invention could use other electroviscous fluids, such as an electromagnetic fluid and apply a magnetic field to a portion of the electromagnetic fluid to effect a change in the viscosity thereof.

From the above description of preferred embodiments of the invention, those skilled in the art will perceive improvements, changes and modifications. Such improvements, changes and modifications within the skill of the art are intended to be covered by the appended claims.

Having described a specific preferred embodiment of the invention, the following is claimed:

1. An apparatus for connection between relatively movable parts, said apparatus comprising:
   means defining a variable volume fluid chamber having a first portion for connection with one of the parts and a second portion for connection with another of the parts, said chamber having fluid therein for resisting movement of the parts relative to each other;
   a valve for controlling fluid flow from said chamber to a location at which the fluid does not resist relative movement of the parts;
   said valve including a valve member movable from a first position to provide fluid communication between said chamber and said location; and
   an electroviscous fluid control device for resisting movement of said valve member from said first position.

2. The apparatus set forth in claim 1 wherein said valve member is disposed within a valve bore for axial movement and has a portion for restricting fluid flow from said chamber, said electroviscous control device includes an electrorheological fluid in a compliance chamber, in a passage communicating with said compliance chamber and in an annular chamber communicating with said passage, said electrorheological fluid in said annular chamber engaging said valve member at a location opposite said portion of said valve member, said electrorheological fluid having a viscosity which varies as a function of the magnitude of an electrical field applied thereto, said electroviscous fluid control device further including means for applying an electrical field to a portion of said electrorheological fluid disposed in said passage to vary the viscosity of said portion of said electrorheological fluid to block flow of said electrorheological fluid from said annular chamber to thereby resist movement of said valve member to said first position.

3. The apparatus set forth in claim 2 wherein said means for applying the electrical field includes first and second electrically conductive members disposed in said passage and having a portion of said electrorheological fluid disposed therebetween, said first member being electrically connected with a first pole of a power source and said second member being electrically connected with a second opposite pole of the power source for applying the electrical field to said portion of said electrorheological fluid disposed between said first and second members.

4. The apparatus set forth in claim 3 wherein said first member includes a pair of plates defining an internal spiral passage therein and said second member is a spiral rod disposed in said spiral passage and spaced away from surfaces of said pair of plates defining said spiral passage.

5. The apparatus set forth in claim 2 further including a sensor and a controller for controlling the magnitude of the electrical field applied to said portion of said electrorheological fluid disposed in said passage in response to receiving a signal from a sensor indicative of a condition of the parts.

6. The apparatus set forth in claim 1 wherein said means defining said variable volume fluid chamber is a resilient bellows having a spring integrally molded in crests of said bellows body portion for biasing said bellows to an extended position.

7. An apparatus for damping relative movement of parts, said apparatus comprising:
   a cylinder defining a fluid chamber;
   a piston located in said fluid chamber and dividing said fluid chamber into first and second chamber portions;
   said piston being connected with one of the parts and said cylinder being connected with the other of the parts;
   said piston and cylinder being relatively movable in compression and expansion strokes to damp relative movement of the parts;
   means providing for fluid communication between said first and second chamber portions including a valve for controlling fluid flow between said first and second chamber portions during a compression stroke;
   said valve including a valve member movable from a closed position to an open position allowing fluid communication between said first and second chamber portions; and
   an electroviscous fluid control device for controlling movement of said valve member between the open and closed positions.

8. The apparatus set forth in claim 7 wherein said valve member is disposed within a valve bore for axial movement and has a portion for restricting fluid flow between said first and second chamber portions and said electroviscous fluid control device resists movement of said valve member from the closed position to the open position.

9. The apparatus set forth in claim 8 wherein said electroviscous fluid control device includes an electrorheological fluid communicated from a compliance chamber through a passage, a portion of said electrorheological fluid being disposed in an annular chamber communicating with said passage and in engagement with said valve member at location opposite said portion of said valve member for blocking fluid flow, said electrorheological fluid having a viscosity which varies as a function of the magnitude of an electrical field applied thereto, said electroviscous fluid control device further includes means for applying the electrical field to a portion of said electrorheological fluid disposed in said passage to vary the viscosity of said portion of said electrorheological fluid to block flow of said electrorheological fluid from said annular chamber to thereby resist movement of said valve member.

10. The apparatus set forth in claim 9 wherein said means for applying the electrical field includes first and second electrically conductive members disposed in said passage and having a portion of said electrorheological fluid disposed therebetween, said first member being electrically connected with a first pole of a power source and said second member being electrically connected with a second opposite pole of the power source to apply said electrical field to said portion of said electrorheological fluid disposed between said first and second members.

11. The apparatus set forth in claim 10 further including a sensor and a controller for controlling the magnitude of the electrical field applied to said portion of said electrorheological fluid disposed between said first and second members in response to receiving a signal from said sensor indicative of a condition of the parts.

12. The apparatus set forth in claim 11 wherein said sensor senses the position of said piston relative to said cylinder.

13. The apparatus set forth in claim 10 wherein said first member includes a tubular plate member and said second member is a cylindrical rod member disposed concentrically within and radially spaced from said tubular plate member.

14. The apparatus set forth in claim 10 wherein said first member includes a pair of plates having an internal spiral passage and said second member is a spiral rod disposed in said spiral passage and spaced from engaging the surface of said spiral passage.

15. The apparatus set forth in claim 10 wherein said first and second members are spaced apart plates extending in a direction parallel to each other.

16. The apparatus set forth in claim 7 wherein said electroviscous fluid control device and said valve member are carried by said piston.

17. The apparatus set forth in claim 7 further including a housing for connection with one of the parts, said electroviscous fluid control device and said valve member being located within said housing.

18. An apparatus for providing fluid communication between first and second chamber portions of a fluid damper which comprises a cylinder defining a fluid chamber and a piston dividing the chamber into the first and second chamber portions and which piston and cylinder are relatively movable in compression and expansion strokes, said apparatus comprising:
   means defining a fluid passage in said piston communicating the first and second chamber portions;
   a valve member carried by said piston and movable relative thereto to control flow through said fluid passage;
   spring means biasing said valve member into a position restricting flow between said chambers;
   said valve member having a surface against which fluid pressure acts upon movement of said piston and cylinder during a compression stroke to urge said valve member to open against the bias of said spring to allow fluid flow between said chambers; and
   an electroviscous fluid control device for controllably resisting movement of said valve member against the bias of said spring.

19. The apparatus set forth in claim 18 wherein said electroviscous fluid control device includes an electrorheological fluid in a compliance chamber, in a second passage communicating with said compliance chamber and in an annular chamber communicating with said second passage, said electrorheological fluid in said annular chamber engaging said valve member at a location opposite said surface against which fluid pressure acts, said electrorheological fluid having a viscosity which varies as a function of the magnitude of an electrical field applied thereto, said electroviscous fluid control device further including means for applying an electrical field to a portion of said electrorheological fluid disposed in said second passage to vary the viscosity of said portion of said electrorheological fluid to block flow of said electrorheological fluid through said second passage from said annular chamber to thereby resist movement of said valve member against the bias of said spring.

20. The apparatus set forth in claim 19 wherein said means for applying the electrical field includes first and second electrically conductive members disposed in said second passage and having said portion of said electrorheological fluid disposed therebetween, said first member being electrically connected with a first pole of a power source and said second member being electrically connected with a second opposite pole of the power source to apply said electrical field to said portion of said electrorheological fluid disposed between said first and second members.

21. The apparatus set forth in claim 20 further including a sensor and a controller for controlling the magnitude of the electrical field applied to said portion of said electrorheological fluid disposed between said first and second members in response to receiving a signal from said sensor indicative of a condition of the fluid damper.

22. The apparatus set forth in claim 20 wherein said first member includes a tubular plate member and said second member is a cylindrical rod member disposed concentrically within and radially spaced from said tubular plate member.

23. The apparatus set forth in claim 20 further including a third electrically conductive member, said first and third members are identical tubular plate members located coaxially with and axially spaced from one another, said second member is a cylindrical rod member disposed concentrically within and radially spaced from said first and third members, said third member being connected with said first pole of said power source separately from said first member for increasing the viscosity of a portion of the electrorheological fluid disposed between said third and second members while another portion of the electrorheological fluid disposed between the first and second members is unaffected.

24. A vehicle suspension system comprising:
   damping means for controlling the rate at which vehicle parts move relative to one another including:
      a cylinder defining a fluid damping chamber,
      a piston located in said fluid damping chamber and dividing said fluid damping chamber into first and second chamber portions,
      said piston having a piston rod connected thereto for connection with one of the parts and said cylinder being for connection with the other of the parts,
      said piston and cylinder being relatively movable in compression and expansion strokes to damp relative movement of the parts,
      first means providing for fluid communication between said first and second chamber portions including a first valve for controlling fluid communication between said first and second chamber portions,
      said first valve including a first valve member movable between a first position allowing fluid flow between said first and second chamber portions and a second position restricting fluid flow between said first and second chamber portions during a compression stroke, and
      a first electroviscous fluid control device for controlling the movement of said first valve member;
   a spring connectable with the relatively movable vehicle parts for biasing the parts to an initial position, said spring being compressible and extendable during relative movement of the parts; and fluid spring means for resisting compression of said spring, said fluid spring means including:
  a bellows having a spring integrally molded in crests of said bellows for biasing said bellows to an extended position;
  means in said bellows defining a variable volume fluid spring, said fluid spring chamber resisting compression of said bellows as a function of the amount of fluid in said fluid spring chamber;
  a second valve for controlling fluid flow from said fluid spring chamber,
  said second valve including a second valve member movable from a first position to allow fluid flow from said fluid spring chamber, and
  a second electroviscous fluid control device for controlling movement of said second valve member from said first position.

25. The vehicle suspension system set forth in claim 24 wherein said first valve member is disposed within a valve bore for axial movement and has a portion for restricting fluid flow between said first and second chamber portions and said first electroviscous fluid control device is for resisting movement of said first valve member from the second position to the first position.

26. The vehicle suspension system set forth in claim 25 wherein said first electroviscous fluid control device includes a first electrorheological fluid in a first compliance chamber, in a passage communicating with said first compliance chamber and in a first annular chamber communicating with said passage, said electrorheological fluid in said annular chamber engaging said first valve member at a location opposite said portion of said valve member for restricting fluid flow, said first electrorheological fluid having a viscosity which varies as a function of the magnitude of an electrical field applied thereto, said first electroviscous fluid control device further including means for applying an electrical field to a portion of said electrorheological fluid disposed in said passage to vary the viscosity of said portion of said first electrorheological fluid to block flow of said first electrorheological fluid from said first annular chamber to thereby resist movement of said first valve member.

27. The vehicle suspension system set forth in claim 24 further including a sensor and a controller for controlling the said first and second electroviscous fluid control devices in response to receiving a signal from said sensor indicative of a condition of the parts.

28. The vehicle suspension system set forth in claim 24 wherein said second electroviscous fluid control device includes a second electrorheological fluid in a second compliance chamber, in a passage communicating with said second compliance chamber and in a second annular chamber communicating with said passage, said electrorheological fluid in said second annular chamber engaging said second valve member at a location opposite said portion of said valve member for restricting fluid flow, said second electrorheological fluid having a viscosity which varies as a function of the magnitude of an electrical field applied thereto, said second electroviscous fluid control device further including means for applying an electrical field to a portion of said second electrorheological fluid disposed in said passage to vary the viscosity of said portion of said second electrorheological fluid to block flow of said second electrorheological fluid from said second annular chamber to thereby resist movement of said second valve member.

29. The vehicle suspension system set forth in claim 24 wherein said fluid damping means has a longitudinal central axis disposed coaxially with a longitudinal central axis of said fluid spring means.

30. The vehicle suspension system set forth in claim 29 wherein a portion of said piston rod of said fluid damping means extends through said bellows of said fluid spring means.

* * * * *